US010837431B2

(12) United States Patent
Tonegawa et al.

(10) Patent No.: US 10,837,431 B2
(45) Date of Patent: Nov. 17, 2020

(54) CONTROL VALVE FOR VARIABLE DISPLACEMENT COMPRESSOR

(71) Applicant: TGK CO., LTD., Tokyo (JP)

(72) Inventors: Masaaki Tonegawa, Tokyo (JP); Hiroshi Hamada, Tokyo (JP)

(73) Assignee: TGK CO., LTD., Tokyo (JP)

( * ) Notice: Subject to any disclaimer, the term of this patent is extended or adjusted under 35 U.S.C. 154(b) by 359 days.

(21) Appl. No.: 15/945,618

(22) Filed: Apr. 4, 2018

(65) Prior Publication Data

US 2018/0291888 A1 Oct. 11, 2018

(30) Foreign Application Priority Data

Apr. 7, 2017 (JP) ................................ 2017-076942

(51) Int. Cl.
*F04B 27/18* (2006.01)
*F04B 49/22* (2006.01)

(52) U.S. Cl.
CPC .......... *F04B 27/1804* (2013.01); *F04B 49/22* (2013.01); *F04B 2027/1813* (2013.01); *F04B 2027/1831* (2013.01); *F04B 2027/1859* (2013.01); *F04B 2027/1868* (2013.01); *F04B 2027/1881* (2013.01)

(58) Field of Classification Search
CPC ...... F04B 49/22; F04B 49/12; F04B 27/1804; F04B 39/10; F04B 2027/1881; F04B 2027/1813; F04B 2027/1859; F04B 2027/1831; F04B 2027/1868; F04B 2205/064; F04B 2205/02; F16K 31/0624; F16K 31/0603; F16K 31/0613
See application file for complete search history.

(56) References Cited

U.S. PATENT DOCUMENTS

| | | | |
|---|---|---|---|
| 6,358,017 B1* | 3/2002 | Ota ...................... | F04B 27/1804 417/222.2 |
| 6,361,283 B1* | 3/2002 | Ota ...................... | F04B 27/1804 417/222.2 |
| 6,546,742 B1* | 4/2003 | Ota ...................... | B60H 1/3208 62/133 |
| 9,732,874 B2* | 8/2017 | Saeki .................. | F16K 31/0613 |

(Continued)

FOREIGN PATENT DOCUMENTS

JP 2010-101202 A 5/2010

*Primary Examiner* — Nathan C Zollinger
(74) *Attorney, Agent, or Firm* — Muncy, Geissler, Olds & Lowe, PC

(57) ABSTRACT

A control valve includes: a body having a control chamber communication port and a suction chamber communication port; a valve element that moves toward and away from a valve hole to close and opening a bleed valve, the ports communicating with each other through the valve hole; a solenoid to generate a drive force in an opening direction of the bleed valve; and a pressure sensing element to sense a pressure in the suction chamber or a pressure in the control chamber, and generate a counterforce against the drive force from the solenoid depending on a magnitude of the sensed pressure. An opening degree of the bleed valve is controlled so that the sensed pressure becomes a set pressure. A bleed passage for delivering the refrigerant introduced through the control chamber communication port to the suction chamber even while the bleed valve is in a closed state is formed.

7 Claims, 12 Drawing Sheets

(56) References Cited

U.S. PATENT DOCUMENTS

| | | | |
|---|---|---|---|
| 9,903,362 B2* | 2/2018 | Saeki | F04B 49/225 |
| 10,113,539 B2* | 10/2018 | Sugamura | F04B 27/1804 |
| 10,557,463 B2* | 2/2020 | Sugamura | F04B 27/1804 |
| 2014/0130916 A1* | 5/2014 | Saeki | F16K 31/0613 |
| | | | 137/625.48 |
| 2015/0010410 A1* | 1/2015 | Saeki | F04B 49/225 |
| | | | 417/228 |
| 2015/0275874 A1* | 10/2015 | Ota | F04B 27/1804 |
| | | | 417/222.1 |
| 2016/0290326 A1* | 10/2016 | Sugamura | F04B 27/1804 |
| 2017/0356430 A1* | 12/2017 | Irie | F04C 28/125 |
| 2018/0291888 A1* | 10/2018 | Tonegawa | F16K 31/0613 |

* cited by examiner

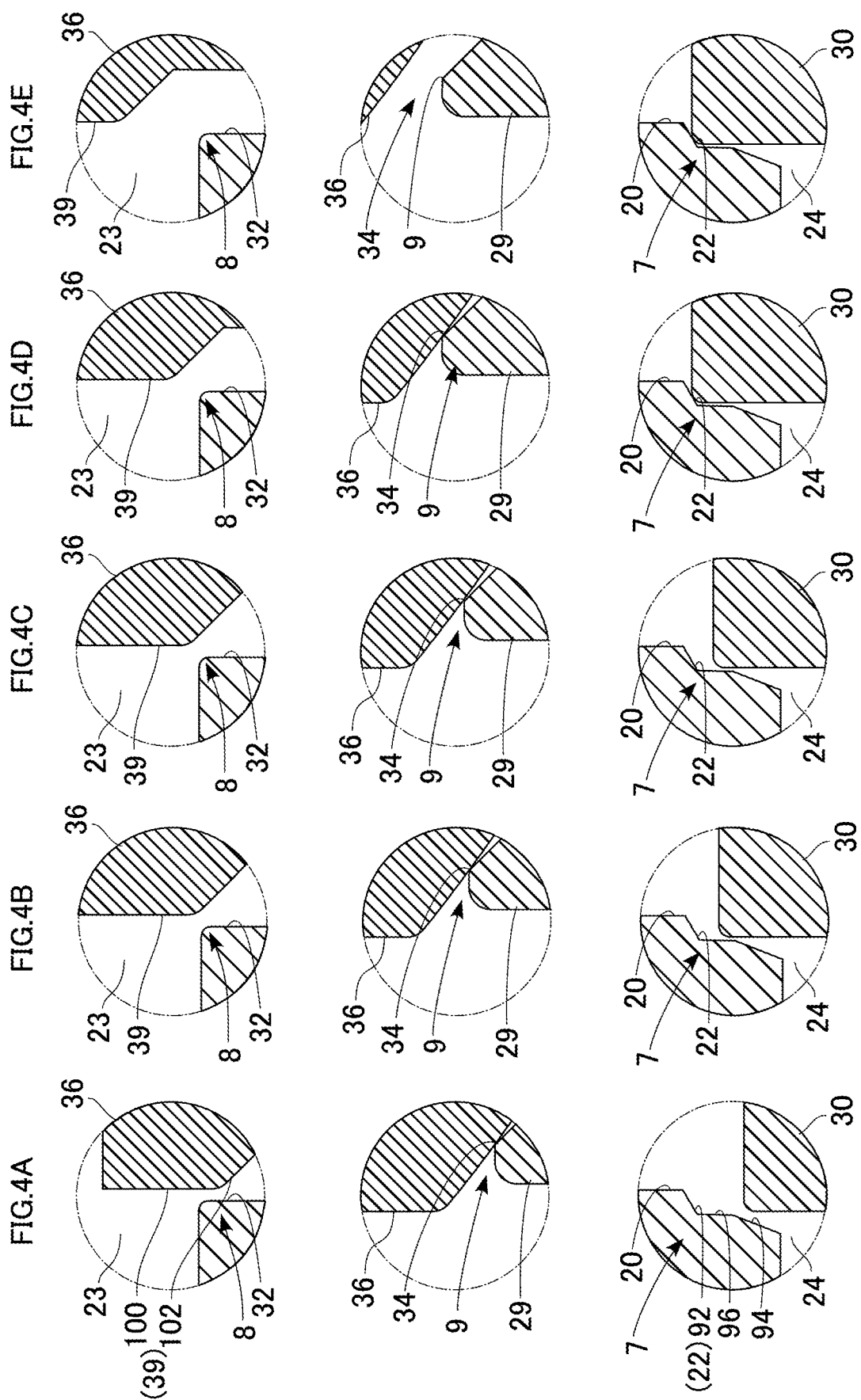

STROKE

Isol

STROKE

Isol

CONTROL VALVE FOR VARIABLE DISPLACEMENT COMPRESSOR

CLAIM OF PRIORITY

This application claims priority to Japanese Patent Application No. 2017-076942 filed on Apr. 7, 2017, which is incorporated herein by reference.

BACKGROUND OF THE INVENTION

1. Field of the Invention

The present invention relates to a control valve for controlling the discharging capacity of a variable displacement compressor.

2. Description of the Related Art

An automotive air conditioner generally includes a compressor, a condenser, an expander, an evaporator, and so forth arranged in a refrigeration cycle. The compressor is, for example, a variable displacement compressor (hereinafter also referred to simply as a "compressor") capable of varying the refrigerant discharging capacity in order to maintain a constant level of cooling capacity irrespective of the engine speed. In this compressor, a piston for compression is linked to a swash plate, which is mounted onto a rotational shaft driven by an engine. The angle of the swash plate is changed to change the stroke of the piston, by which the refrigerant discharging rate is regulated. The angle of the swash plate is changed continuously by supplying part of the discharged refrigerant into a hermetically-closed control chamber and thus changing the balance of pressures working on both faces of the piston.

The pressure (referred to as a "control pressure" below) in this control chamber is controlled by a control valve for inflow control provided between a discharge chamber and the control chamber of the compressor or by a control valve for outflow control provided between the control chamber and a suction chamber, for example (refer to JP 2010-101202 A, for example). In a case where a control valve for inflow control is used, a fixed orifice through which the refrigerant in the control chamber is released into the suction chamber is provided in a housing of the compressor. In a case where a control valve for outflow control is used, a fixed orifice through which the refrigerant from the discharge chamber is introduced into the control chamber is provided in the housing of the compressor. The refrigerant contains oil, which provides functions of lubricating and cooling internal mechanisms while circulating in the compressor. The compressor is thus provided with an internal circulation path for circulation of the refrigerant inside the compressor in addition to an external circulation path for circulation of the refrigerant in the refrigeration cycle.

RELATED ART LIST

Japanese Patent Application Publication No. 2010-101202

Note that the internal circulation in the compressor does not contribute to the refrigeration cycle. Thus, when the internal circulation is unnecessarily large, it may be difficult to provide sufficient external circulation in a variable capacity operation range (during control of the compressor), which may lead to lower power of the air conditioner. In addition, it is desirable to flexibly switch the control of the compressor depending on the condition of the vehicle while taking the power of the air conditioner into account.

SUMMARY OF THE INVENTION

The present invention has been made in view of these circumstances, and an object thereof is to provide a control valve suitable for efficiently switching the operation of a compressor.

One embodiment of the present invention relates to a control valve applicable to a variable displacement compressor having a suction chamber, a discharge chamber, and a control chamber, and having a discharge capacity varied by regulating a pressure in the control chamber. The control valve includes: a body having a control chamber communication port communicating with the control chamber and a suction chamber communication port communicating with the suction chamber; a valve element that moves toward and away from a valve hole to close and opening a bleed valve, the control chamber communication port and the suction chamber communication port communicating with each other through the valve hole; a solenoid to generate a drive force in an opening direction of the bleed valve depending on an amount of supplied current; and a pressure sensing element to sense a pressure in the suction chamber or a pressure in the control chamber, and generate a counterforce against the drive force from the solenoid depending on a magnitude of the sensed pressure. An opening degree of the bleed valve is controlled so that the sensed pressure becomes a set pressure associated with the amount of current supplied to the solenoid. A bleed passage for delivering the refrigerant introduced through the control chamber communication port to the suction chamber even while the bleed valve is in a closed state is formed. Note that the "closed state" used herein can include a fully closed state in which a valve element is seated on a valve seat and a state in which a valve element is inserted in a valve hole and a clearance (an orifice or a clearance seal) is formed between the valve element and a valve hole.

According to this embodiment, in a control valve having a bleed flow rate controlled so that a sensed pressure becomes a set pressure during steady control, a minimum amount of bleeding through a bleed passage is provided even while a bleed valve is in a closed state. The control valve thus allows constant internal circulation of refrigerant in a compressor. In addition, at startup of the compressor, the bleed valve is further opened to a fully open state, which increase the bleeding and rapidly changes the operation to maximum capacity operation. This allows efficient switching of the operation condition of the compressor.

BRIEF DESCRIPTION OF THE DRAWINGS

FIGS. 4A to 4E are partially enlarged cross-sectional views illustrating structures and operations of a first valve element and a second valve element;

DETAILED DESCRIPTION OF THE INVENTION

Figure 1:
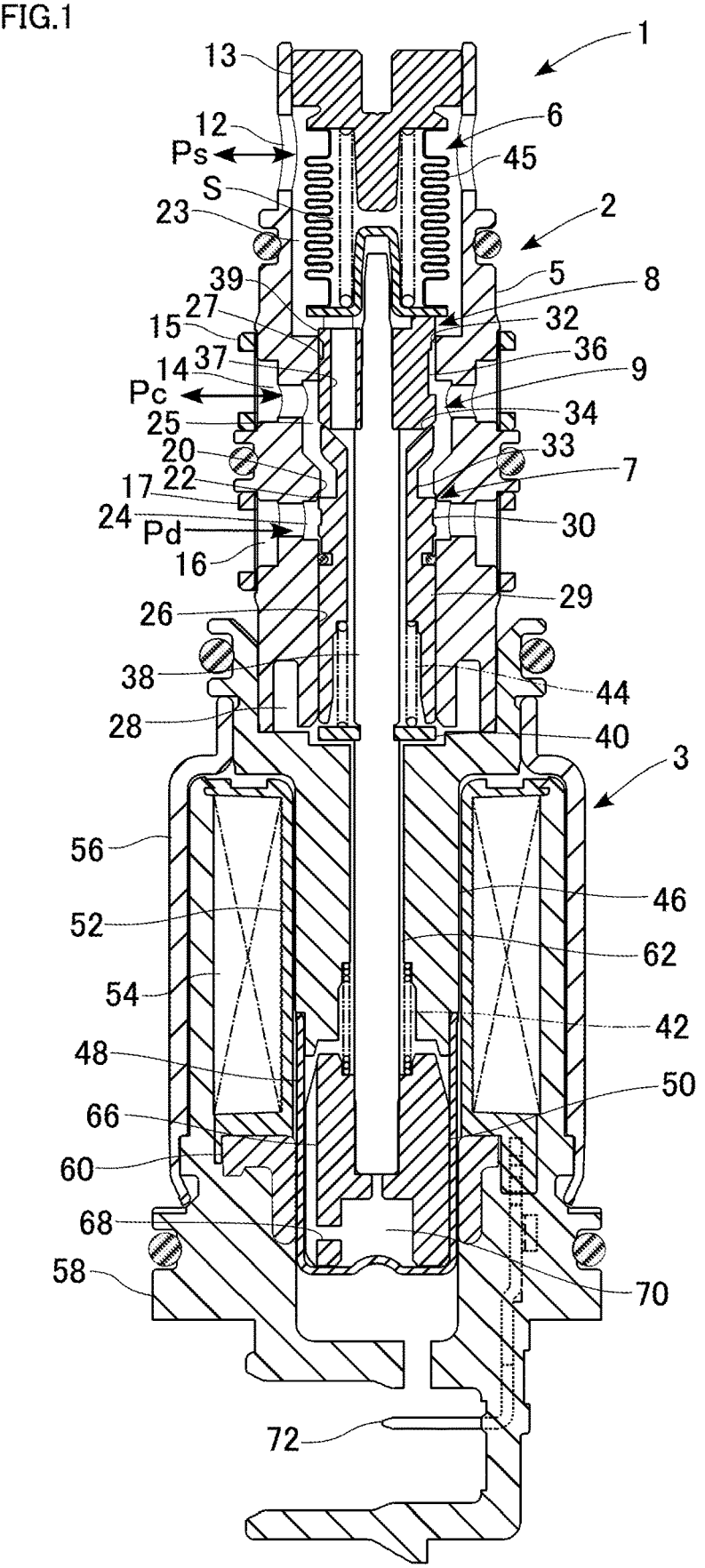
FIG. 1 is a cross-sectional view illustrating a structure of a control valve according to a first embodiment.

Certain embodiments of the invention will now be described. The description is not intended to limit the scope of the present invention, but is to exemplify the invention.

Embodiments of the present invention will now be described in detail with reference to the drawings. In the description below, for convenience of description, the positional relationship in each structure may be expressed with reference to how the structure is depicted in the drawings. In the following embodiments and modifications thereof, components that are substantially the same will be designated by the same reference numerals and redundant description thereof may be omitted as appropriate.

First Embodiment

FIG. 1 is a cross-sectional view illustrating a structure of a control valve according to a first embodiment.

The control valve 1 controls the discharging capacity of a variable displacement compressor (hereinafter simply referred to as a "compressor") installed in a refrigeration cycle of an automotive air conditioner. The compressor compresses refrigerant flowing through the refrigeration cycle into a high-temperature and high-pressure gaseous refrigerant, and discharges the compressed gaseous refrigerant. The gaseous refrigerant is condensed by a condenser (external heat exchanger) and then adiabatically expanded by an expander into a low-temperature and low-pressure spray of refrigerant. The low-temperature and low-pressure refrigerant is evaporated by an evaporator, and the air inside the vehicle is cooled by the evaporative latent heat. The refrigerant evaporated by the evaporator is returned to the compressor. In this manner, the refrigerant circulates through the refrigeration cycle. The compressor has a rotational shaft rotated by an engine of the automobile. A piston for compression is linked to a wobble plate mounted on the rotational shaft. The angle of the wobble plate is changed to change the stroke of the piston and to thus regulate the refrigerant discharging rate. The control valve 1 adjusts a balance between the flow rate of refrigerant introduced from a discharge chamber to a control chamber of the compressor and the flow rate of refrigerant delivered from the control chamber into a suction chamber, to change the angle of the wobble plate and thus the discharging capacity of the compressor.

The compressor is provided with an internal circulation path for circulation of the refrigerant inside the compressor in addition to an external circulation path for circulation of the refrigerant in the refrigeration cycle. Part of the refrigerant introduced into a cylinder of the compressor leaks in the form of so-called blow-by gas through a clearance between the cylinder and the piston into the control chamber. The blow-by gas also contributes to the internal circulation.

Although the control chamber in the present embodiment is a crankcase, the control chamber may alternatively be a pressure chamber separately provided in or outside of the crankcase in a modification.

The control valve 1 is a so-called Ps sensing valve for outflow control configured to control the flow rate of refrigerant to be bled from the control chamber to the suction chamber, so as to keep a suction pressure Ps (corresponding to a "pressure to be sensed") of the compressor at a preset pressure. The control valve 1 is formed of an assembly of a valve unit 2 and a solenoid 3 in an axial direction. The valve unit 2 includes a first valve 7 for controlling the flow rate of refrigerant flowing from the discharge chamber to the control chamber, and a second valve 8 for controlling the flow rate of refrigerant flowing from the control chamber to the suction chamber. The first valve 7 is fully closed at the startup of the compressor, and functions as an orifice with a constant opening degree to introduce part of discharged refrigerant into the control chamber during steady operation of the compressor. The second valve 8 is fully open at the startup of the compressor, and functions as a so-called bleed valve. The opening degree of the second valve 8 is regulated so that the suction pressure Ps becomes a set pressure during steady control of the compressor. The solenoid 3 generates a drive force in the closing direction of the first valve 7 and the opening direction of the second valve 8 depending on the amount of supplied current. The valve unit 2 has a body 5 having a stepped cylindrical shape, and contains the first valve 7, the second valve 8 and a power element 6 inside the body 5. The power element 6 functions as a "pressure sensing element" that generates a counterforce against the drive force of the solenoid 3 depending on the magnitude of the suction pressure Ps.

Note that, in the present embodiment, a "closed" state of a valve includes both of a "fully closed" state in which a valve member is seated on a valve seat and completely close a valve hole like an on-off valve and a state in which a valve element is inserted into a valve hole and a clearance (an orifice or a clearance seal) is formed between the valve element and a valve hole like a spool valve. For particularly referring to the former state, a "fully closed" state will be used. In a case of an orifice in the latter state, the valve is open with a "constant opening degree" even in the closed state.

The body 5 has ports 12, 14, and 16 formed in this order from a top end thereof. The port 12 functions as a "suction chamber communication port" communicating with the suction chamber of the compressor. The port 14 functions as a "control chamber communication port" communicating with the control chamber of the compressor. The port 16 functions as a "discharge chamber communication port" communicating with the discharge chamber of the compressor. An end member 13 is fixed to the body 5 in such a manner as to close an upper end opening of the body 5. A lower end part of the body 5 is press-fitted in an upper end part of the solenoid such that the valve unit 2 and the solenoid 3 are fixed to each other.

In the body 5, a first passage through which the port 16 and the port 14 communicate with each other and a second passage through which the port 14 and the port 12 communicate with each other are formed. The first valve 7 is provided in the first passage while the second valve 8 is provided in the second passage. The first passage functions as a "supply passage," and the first valve 7 functions as a "supply valve." The second passage functions as a "bleed passage," and the second valve 8 functions as a "bleed valve." The control valve 1 has a structure in which the power element 6, the second valve 8, the first valve 7, and the solenoid 3 are arranged in this order from one end of the control valve 1. In the first passage, a first valve hole 20 and a first valve seat 22 are provided. In the second passage, a second valve hole 32 is provided.

The port 12 allows a working chamber 23 defined (formed) in an upper part of the body 5 and the suction chamber to communicate with each other. The power element 6 is disposed in the working chamber 23. The port 16 allows refrigerant at a discharge pressure Pd to be introduced from the discharge chamber. A first valve chamber 24 is formed between the port 16 and the first valve hole 20. The first valve hole 20 has a stepped with a diameter near an open end thereof being slightly larger. The first valve seat 22 is located slightly inside the open end. Refrigerant whose pressure is changed to a control pressure Pc through the first valve 7 is delivered toward the control chamber through the port 14, and refrigerant at the control pressure Pc from the control chamber is introduced through the port 14. Refrigerant whose pressure is changed to the suction pressure Ps through the second valve 8 is delivered toward the suction chamber through the port 12.

Cylindrical filter members 15 and 17 are mounted on the ports 14 and 16, respectively. The filter members 15 and 17 each have a mesh for preventing or reducing entry of foreign materials into the body 5. The filter member 17 restricts entry of foreign materials into the port 16 while the first valve 7 is open, and the filter member 15 restricts entry of foreign materials into the port 14 while the second valve 8 is open.

The second valve hole 32 is formed between the port 14 and the working chamber 23. The second valve hole 32 coaxially communicates with the first valve hole 20. A guiding passage 26 is formed in a lower part (the part opposite to the first valve hole 20 with respect to the first valve chamber 24) of the body 5. A stepped cylindrical valve drive member 29 is slidably inserted in the guiding passage 26. A second valve chamber 25 is formed between the port 14 and the first valve hole 20.

The valve drive member 29 has an upper half part being reduced in diameter, extending through the first valve hole 20, and constituting a partition part 33 that separates the inside from the outside of the valve drive member 29. A stepped portion formed at a middle part of the valve drive member 29 constitutes a first valve element 30. The first valve element 30 is moved into and out of the first valve hole 20 from the first valve chamber 24 side to control the flow rate of the refrigerant flowing from the discharge chamber to the control chamber. The first valve element 30 touches and leaves the first valve seat 22 to close and open the first valve 7. An upper part of the partition part 33 is tapered with a diameter increasing upward. A second valve seat 34 is formed at an upper end opening of the partition part 33. The second valve seat 34 is a movable valve seat that is integrally displaced with the valve drive member 29.

An elongated actuating rod 38 is provided along the axis of the body 205. The actuating rod 38 has an upper half part extending through the valve drive member 29, and an upper portion of the upper half part has a diameter decreasing in a stepwise manner. A second valve element 36 is press-fitted around the stepped portion. An upper end of the actuating rod 38 passes through the second valve element 36 and is operably connectable with the power element 6. A lower end of the actuating rod 38 is connected with the plunger 50 of the solenoid 3.

A spring support 40 is fitted into a middle portion in the axial direction of the actuating rod 38. A spring 44 (functioning as a "biasing member") that biases the valve drive member 29 in the closing direction of the first valve 7 is mounted between the valve drive member 29 and the spring support 40. While the first valve 7 is actuated, the valve drive member 29 and the spring support 40 are tensioned by the elastic force of the spring 44, and the valve drive member 29 and the actuating rod 38 thus move integrally.

The second valve element 36 extends through the second valve hole 32, and coaxially faces the valve drive member 29. The second valve element 36 is fixed to the actuating rod 38, and slidably supported by the body 5. Thus, a lower part of the second valve hole 32 serves as a guide passage 27. A plurality of communication passages 37 are formed to extend through the second valve element 36 in the axial direction. The communication passages 37 constitute a third passage through which the port 14 and the port 12 communicate with each other on an inner side of the second passage. A third valve 9 is provided in the third passage.

An upper end portion of the second valve element 36 constitutes a spool portion 39. The spool portion 39 is inserted into and removed from the second valve hole 32 to close and open the second valve 8. In addition, the second valve element 36 touches and leaves the second valve seat 34 to close and open the third valve 9. The third valve 9 can be fully closed, but the second valve 8 does not become fully closed. The third valve 9 functions as an "opening/closing mechanism" that opens the third passage while the first valve 7 is in the closed state depending on the magnitude of the current supplied to the solenoid 3.

A working chamber 28 is formed between the body 5 and the solenoid 3. The working chamber 28 communicates with the working chamber 23 via the internal passage 35 and the communication passages 37 of the valve drive member 29. Thus, the suction pressure Ps in the working chamber 23 is introduced into the working chamber 28.

The power element 6 includes a bellows 45, which senses the suction pressure Ps and is displaced thereby. The displacement of the bellows 45 generates a counterforce against the solenoid force. The counterforce is transmitted to the first valve element 30 via the second valve element 36.

The solenoid 3 includes a stepped cylindrical core 46, a bottomed cylindrical sleeve 48 mounted in such a manner as to seal off a lower end opening of the core 46, a stepped cylindrical plunger 50 contained in the sleeve 48 and disposed to face the core 46 along the axial direction, a cylindrical bobbin 52 mounted (outserted) around the core 46 and the sleeve 48, an electromagnetic coil 54 wound around the bobbin 52 and configured to generate a magnetic circuit when power is supplied thereto, a cylindrical casing 56 provided in such a manner as to cover the electromagnetic coil 54 from outside, an end member 58 provided in such a manner as to seal off a lower end opening of the casing 56, and a collar 60 made of a magnetic material embedded in the end member 58 at a position below the bobbin 52.

A spring 42 (functioning as a "biasing member") that biases the plunger 50 in the opening direction of the first valve 7 and the closing direction of the second valve 8 and the third valve 9 is mounted between the core 46 and the plunger 50. The spring 42 functions as a so-called off-spring that fully opens the first valve 7 while the solenoid 3 is powered off.

The valve unit 2 and the solenoid 3 are secured in such a manner that the lower end part of the body 5 is press-fitted into an upper end opening of the core 46. The working chamber 28 is formed between the core 46 and the body 5. The actuating rod 38 extends through the center of the core 46 in the axial direction. A lower end part of the actuating rod 38 is press-fitted into an upper half part of the plunger 50. The actuating rod 38 is supported at two points, which are the position of the second valve element 36 and the position of the plunger 50 (see FIG. 1), that is, at an upper position and a lower position. This allows the actuating rod 38 to be more stably driven in the axial direction. The suction pressure Ps of the working chamber 28 is also introduced into the sleeve 48 via a communication passage 62 formed by a spacing between the actuating rod 38 and the core 46.

The actuating rod 38 transmits the solenoid force, which is a suction force generated between the core 46 and the plunger 50, to the second valve element 36. At the same time, a drive force (also referred to as a "pressure-sensing drive force") generated by extraction/contraction movement of the power element 6 is exerted on the second valve element 36 against the solenoid force. Thus, while the second valve 8 is controlled, a force adjusted by the solenoid force and the pressure-sensing drive force acts on the second valve element 36 to appropriately control the opening degree of the second valve 8. At the startup of the compressor, the actuating rod 38 is displaced upward depending on the magnitude of the solenoid force, to greatly lift up the second valve element 36 and fully open the second valve 8 and the third valve 9. In this manner, the bleeding function is provided.

The sleeve 48 is made of a nonmagnetic material. A communicating groove 66 is formed in parallel with the axis on a lateral surface of the plunger 50, and a communicating hole 68 connecting the inside and the outside of the plunger 50 is provided in a lower portion of the plunger 50. Such a structure enables the suction pressure Ps to be introduced into a back pressure chamber 70 through a spacing between the plunger 50 and the sleeve 48.

A pair of connection terminals 72 connected to the electromagnetic coil 54 extend from the bobbin 52, and are led outside through the end member 58. For convenience of explanation, FIG. 1 shows only one of the pair of connection terminals 72. The end member 58 is mounted in such a manner as to cover the entire structure inside the solenoid 3 contained in the casing 56 from below. The end member 58 is formed by molding (injection molding) a corrosion-resistant resin (plastic) material. Ends of the connection terminals 72 are led out from the end member 58 and connected to a not-shown external power supply.

Figure 2:
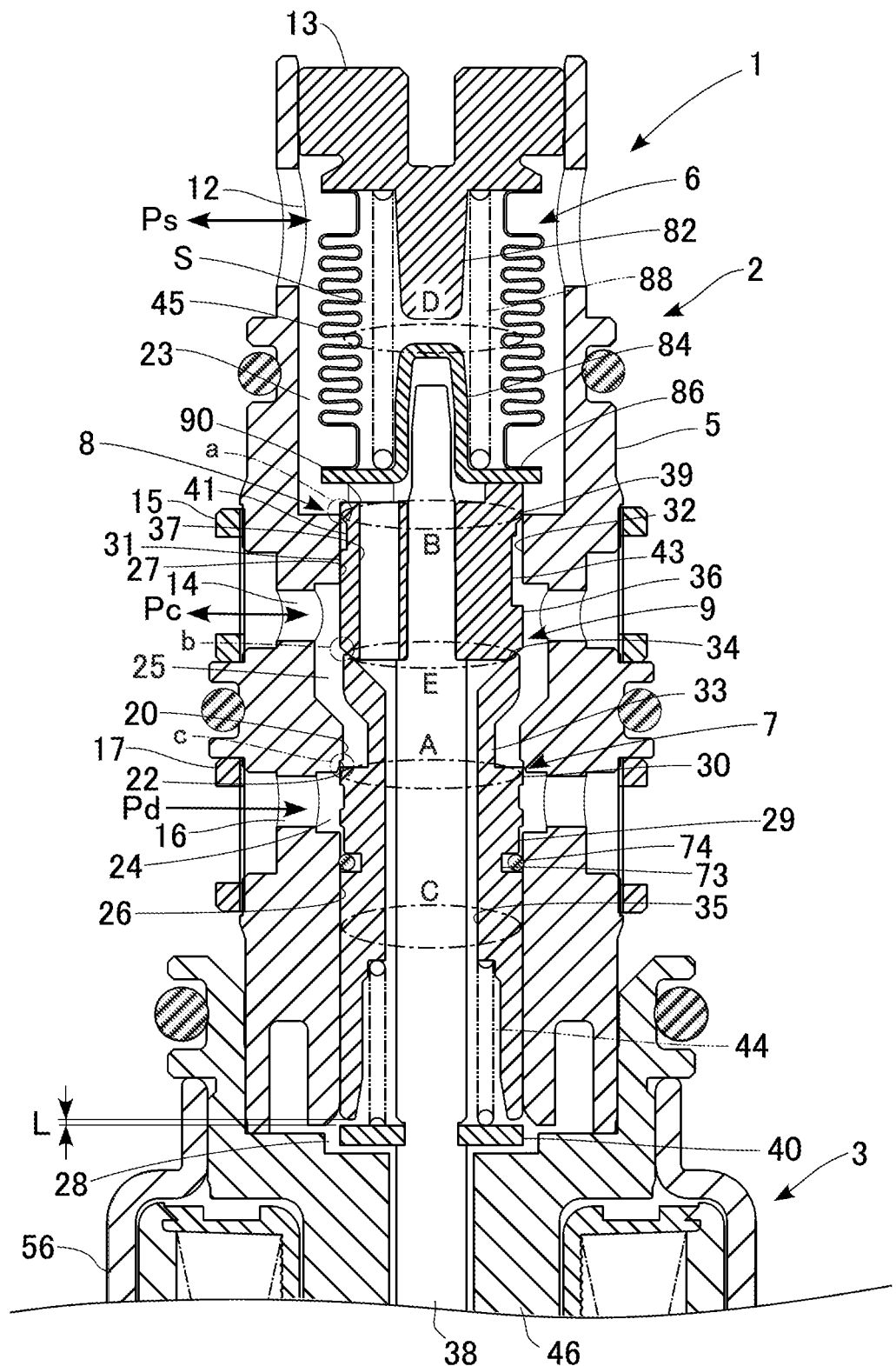
FIG. 2 is a partially enlarged cross-sectional view of the upper half of FIG. 1.

FIG. 2 is a partially enlarged cross-sectional view of the upper half of FIG. 1.

An annular groove 73 is formed around a sliding surface of the valve drive member 29 that slides relative to the guiding passage 26. An 0 ring 74 (sealing member) is fitted into the annular groove 73. This prevents flow of refrigerant through a spacing between the valve drive member 29 and the guiding passage 26. Since the actuating rod 38 is integrated with the second valve element 36, the solenoid force is directly transmitted to the second valve element 36.

An upper end of the valve drive member 29 and a lower end of the second valve element 36 have tapered surfaces that touch and leave each other. This allows the valve drive member 29 to be stably driven in the axial direction in such a manner that the upper end thereof is aligned and that a lower half part thereof is slidably supported in the guiding passage 26.

The second valve element 36 has a sliding portion 31 being slidably supported in the guide passage 27, the spool portion 39 as described above, and a reduced-diameter portion 41 formed between the sliding portion 31 and the spool portion 39. The spool portion 39 has an outer diameter smaller than that of the sliding portion 31, and the reduced-diameter portion 41 has an outer diameter smaller than that of the spool portion 39. The second valve element 36 has a plurality of cut-outs 43 parallel to the axis, which are formed by so-called D-cut (D-shaped cutting), at circumferential positions thereof. The cut-outs 43 are so formed as to reach the reduced-diameter portion 41 and the second valve chamber 25, which form communication passages (bleed passages) that constantly connect the second valve hole 32 with the second valve chamber 25.

A lower end portion of the second valve element 36 has a tapered shape with an outer diameter decreasing downward. In the present embodiment, this tapered surface is a spherical surface (curved surface) having a predetermined curvature. The valve element 36 is thus seated on the second valve seat 34, having the tapered shape, of the valve drive member 29 in line contact with the second valve seat 34. This allows the valve drive member 29 and the second valve element 36 to be integrally and stably driven while the third valve 9 is closed.

The power element 6 includes a first stopper 82 closing an upper end opening of the bellows 45 and a second stopper 84 closing a lower end opening thereof. The bellows functions as a "pressure sensing member." The first stopper 82 is integrally formed with the end member 13. The second stopper 84 is formed into a bottomed cylindrical shape by press forming a metal material and has a flange portion 86 extending radially outward from a lower end opening thereof. The bellows 45 has a bellows body. An upper end part of the body is welded to a lower face of the end member 13 in an airtight manner, and a lower end opening of the body is welded to an upper face of the flange portion 86 in an airtight manner. The inside of the bellows 45 is a hermetically-sealed reference pressure chamber S. A spring 88 for biasing the bellows 45 in an expanding (stretching) direction is disposed between the end member 13 and the flange portion 86 on an inner side of the bellows 45. The reference pressure chamber S is in a vacuum state in the present embodiment.

The end member 13 is a fixed end of the power element 6. The amount by which the end member 13 is press-fitted into the body 5 can be adjusted, so that a set load of the power element 6 (a set load of the spring 88) can be adjusted. A middle part of the first stopper 82 extends downward and inward of the bellows 45, and a middle part of the second stopper 84 extends upward and inward of the bellows 45, which form an axial core of the bellows 45. The bellows 45 expands (stretches) or contracts in the axial direction (in the opening/closing direction of the valves) according to a pressure difference between the suction pressure Ps in the working chamber 23 and a reference pressure in the reference pressure chamber S. As the pressure difference becomes smaller and the bellows 45 expands, a drive force in the opening direction of the first valve 7 and the closing direction of the second valve 8 is applied on the valve drive member 29. Even when the pressure difference becomes larger, the second stopper 84 comes into contact with the first stopper 82 and is stopped thereby at the point where the bellows 45 has contracted by a predetermined amount, and the contraction is thus restricted.

The actuating rod 38 is set such that an upper surface of the spring support 40 is spaced from a lower surface of the valve drive member 29 by at least a predetermined spacing L in a state in which the second valve element 36 is seated on the second valve seat 34 as illustrated in FIG. 2. The predetermined spacing L functions as a so-called "play (looseness)."

As the solenoid force is increased, the actuating rod 38 can be displaced relative to the valve drive member 29 to lift up the second valve element 36. This separates the second valve element 36 and the second valve seat 34 from each other to thus open the third valve 9. In addition, the solenoid force can be directly transmitted to the first valve element 30 in a state in which the spring support 40 and the valve drive member 29 are engaged (in contact) with each other, and the first valve element 30 can be pressed with a great force in the valve closing direction of the first valve 7. This structure functions as a lock release mechanism for releasing a locked state in which the operation of the first valve element 30 is locked owing to a foreign material stuck between the valve drive member 29 and the guiding passage 26 slidable relative to each other.

In the present embodiment, an effective pressure receiving diameter A (sealing diameter) of the first valve element 30 in the first valve 7, an effective pressure receiving diameter B (sealing diameter) of the second valve element 36 in the second valve 8, and a sliding portion diameter C (sealing diameter) of the valve drive member 29 are set to be equal. The term "equal" used herein may include not only a concept of being exactly equal but also a concept of almost equal (substantially equal). Thus, the influences of the discharge pressure Pd, the control pressure Pc, and the suction pressure Ps acting on a combined unit of the first valve element 30 and the second valve element 36 (that is, a combined unit of the valve drive member 29 and the second valve element 36) connected with each other are cancelled. As a result, while the second valve 8 is controlled, the second valve element 36 performs the valve opening or closing operation on the basis of the suction pressure Ps received by the power element 6 in the working chamber 23. That is, the control valve 1 functions as a so-called Ps sensing valve.

In the present embodiment, the influences of the pressures (Pd, Pc, and Ps) acting on the valve elements (the first valve element 30 and the second valve element 36) can be cancelled by setting the diameters A, B, and C to be equal to one another and making the internal passage pass through the valve elements vertically. Specifically, the pressures before and after (above and below in FIG. 2) a combined unit of the second valve element 36, the valve drive member 29, the actuating rod 38, and the plunger 50 connected with one another can be set to an equal pressure (the suction pressure Ps), which achieves pressure cancellation. As a result, the diameters of the valve elements can be set independent of the effective pressure receiving diameter D of the bellows 45, which achieves high design flexibility.

In the present embodiment, the diameter D of the bellows 45 is set to be equal to the diameters A, B, and C. The diameter D, however, may be larger or smaller than the diameters A, B, C. In addition, in the present embodiment, a sealing diameter E of the second valve element 36 in the third valve 9 is smaller than the sealing diameter A of the first valve element 30 in the first valve 7, and a pressure difference (Pc–Ps) between the control pressure Pc and the suction pressure Ps acts on the valve drive member 29 in the opening direction of the third valve 9. Such a pressure receiving structure and the biasing structure of the spring constitute a "differential pressure valve opening mechanism" that opens the third valve 9 when the pressure difference (Pc–Ps) has become a preset pressure difference $\Delta P_{set}$ or higher.

Next, operation of the control valve will be described.

In the present embodiment, the pulse width modulation (PWM) is employed for controlling power supply to the solenoid 3. The PWM control is control based on a supplied pulsed current with a frequency of about 400 Hz set at a predetermined duty ratio, which is performed by a control unit (not illustrated). The control unit includes a PWM output unit to output a pulse signal with a specified duty ratio. Since a known configuration is used for the PWM unit, detailed description thereof is omitted.

Figure 3:
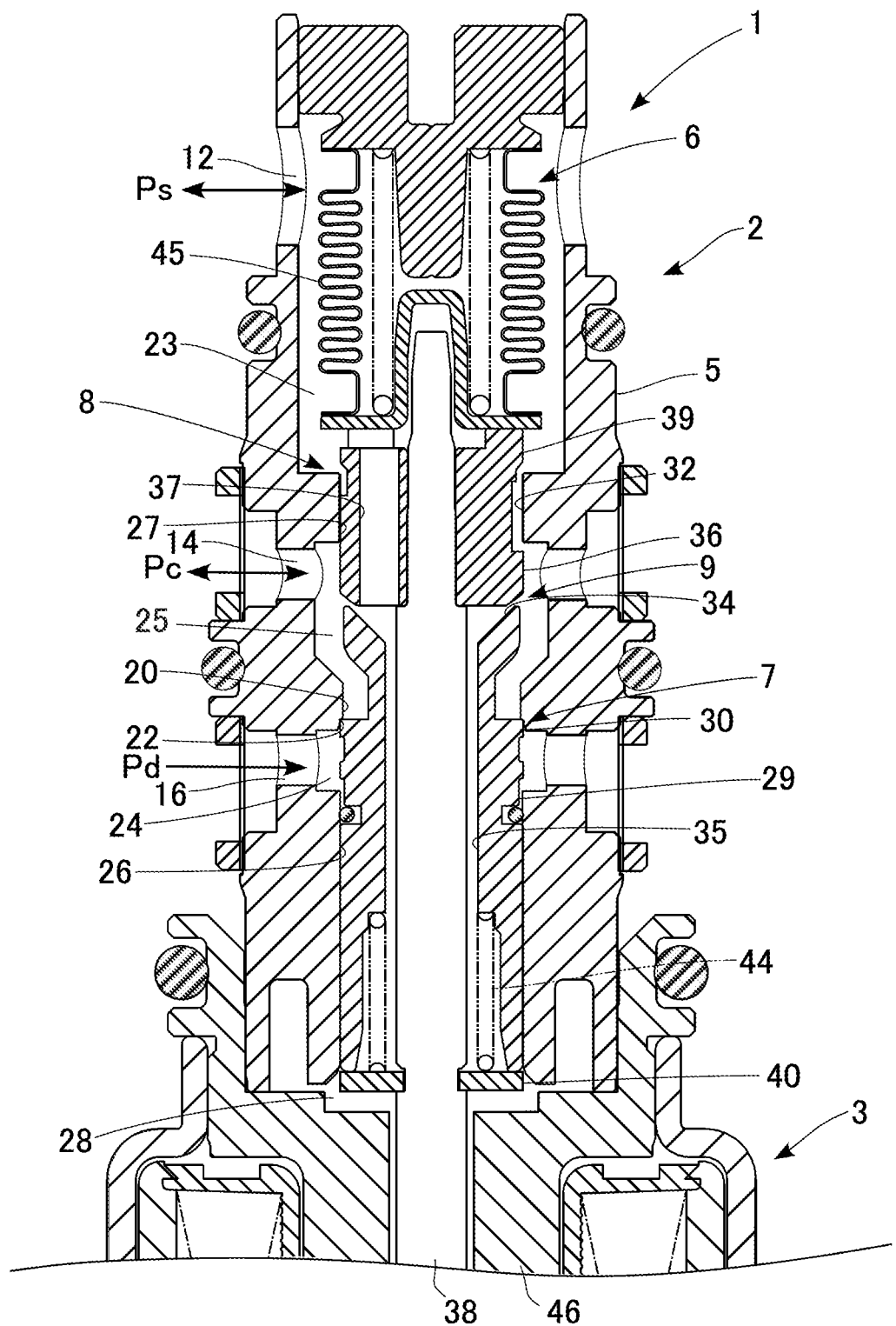
FIG. 3 illustrates operation of the control valve.

FIG. 3 illustrates operation of the control valve. FIG. 2, mentioned above, illustrates a state of the control valve during minimum capacity operation. FIG. 3 illustrates a state in which the bleeding function is being carried out during maximum capacity operation (such as at the startup of the air conditioner). Hereinafter, description will be provided on the basis of FIG. 1 and with reference to FIGS. 2 and 3 where necessary.

In the control valve 1, while the solenoid 3 is powered off, that is, while the air conditioner is not in operation, the suction force does not act between the core 46 and the plunger 50. In the meantime, the valve drive member 29 is pressed downward by the spring 42. As a result, as also shown in FIG. 2, the first valve element 30 moves away from the first valve seat 22 and the first valve 7 becomes fully open. The refrigerant at the discharge pressure Pd introduced through the port 16 then passes through the fully-open first valve 7 and flows through the port 14 to the control chamber. The second valve 8 and the third valve 9 are in the closed state. The second valve 8, however, is a spool valve and thus functions as a fixed orifice. At this point, the combined flow rate of refrigerant flowing through the first valve 7 and the blow-by gas is higher than the flow rate of refrigerant flowing through the orifice of the second valve 8. As a result, the control pressure Pc increases, and the compressor performs the minimum capacity operation. While the solenoid is powered off in this manner, the flow itself in the refrigeration cycle is small. In addition, even though the pressure difference (Pc–Ps) between the control pressure Pc and the suction pressure Ps becomes smaller, appropriate bleeding through the orifice is carried out, which allows a minimum required amount of internal circulation to be provided. Furthermore, the control pressure Pc is prevented from becoming excessively high.

In contrast, when control current (starting current) is supplied to the solenoid 3, such as at the startup of the air conditioner, the core 46 sucks (pulls) the plunger 50. This lifts up the actuating rod 38. In the meantime, the biasing force of the spring 44 lifts up the valve drive member 29, causing the first valve element 30 to be seated on the first valve seat 22 to close the first valve 7 as illustrated in FIG. 3. The actuating rod 38 is further lifted up while being displaced relative to the valve drive member 29, and presses the second valve element 36 upward. Consequently, the second valve element 36 is separated from the second valve seat 34 to open the third valve 9. In addition, the second valve 8 is also fully opened. This allows the refrigerant to be released from the control chamber to the suction chamber at a predetermined flow rate, which lowers the control pressure Pc. The compressor thus performs the maximum capacity operation. In other words, the bleeding function is carried out and the compressor is quickly started.

When the suction pressure Ps becomes sufficiently low in this manner, the power element 6 expands to close the third valve 9. When the control current to be supplied to the solenoid 3 is lowered depending on the preset temperature of air conditioning at this point, the valve drive member 29 and the power element 6 operate integrally and the first valve 7 and the second valve 8 are set at a predetermined opening degrees.

When the current supplied to the solenoid 3 is within a control current range for the second valve 8, the opening degree of the second valve 8 is autonomously regulated so that the suction pressure Ps becomes a preset pressure $P_{set}$ set depending on the amount of current supplied to the solenoid 3. In this control state of the second valve 8, the first valve 7 forms an orifice with a small opening degree. In this state, the suction pressure Ps is relatively low, and the second valve element 36 and the power element 6 are operably connected by the solenoid force and regulate the opening degree of the second valve 8. In this process, the second valve element 36 stops at a valve lifted position where the force in the valve opening direction generated by the spring 42, the solenoid force in the valve closing direction, and the force in the valve opening direction generated by the power element 6 depending on the suction pressure Ps are balanced.

In this process, when the refrigeration load is increased and the suction pressure Ps becomes higher than the preset pressure $P_{set}$, the bellows 45 contracts, and the second valve element 36 is thus displaced relatively upward (in the valve closing direction). As a result, the valve opening degree of the second valve 8 becomes larger, and the compressor operates to increase the discharging capacity. Consequently, the operation changes to lower the suction pressure Ps. Conversely, when the refrigeration load becomes smaller and the suction pressure Ps becomes lower than the preset pressure $P_{set}$, the bellows 45 expands. As a result, the power element 6 biases the second valve element 36 in the valve closing direction, making the valve opening degree of the second valve 8 smaller, and the compressor operates to reduce the discharging capacity. Consequently, the suction pressure Ps is kept at the preset pressure $P_{set}$.

When the engine load is increased while such steady control is performed and the load on the air conditioner is to be reduced, the solenoid 3 of the control valve 1 is switched off from the on state. The suction force then does not act between the core 46 and the plunger 50, and the first valve element 30 is separated from the first valve seat 22 by the biasing force of the spring 42 and the first valve 7 becomes in the fully open state. In this process, the third valve 9 becomes fully closed and the second valve 8 forms an orifice. At this point, the combined flow rate of refrigerant flowing through the first valve 7 and the blow-by gas is higher than the flow rate of refrigerant flowing through the orifice of the second valve 8. Thus, the compressor operates with a minimum capacity.

Next, the structures and operations of the valve elements will be described in detail.

FIGS. 4A to 4E are partially enlarged cross-sectional views illustrating the structures and operations of the first valve element and the second valve element. FIGS. 4A to 4E illustrate processes of the operations from the fully-open state of the first valve (supply valve) until the first valve becomes the fully-closed state and the second valve and the third valve (bleed valve) are opened. The lower drawings of FIGS. 4A to 4E illustrate the states of the first valve 7, the upper drawings thereof illustrate the states of the second valve 8 in the corresponding processes, and the middle drawings thereof illustrate the states of the third valve 9 in the corresponding processes. The upper drawing of FIG. 4A is an enlarged view of part a in FIG. 2, the middle drawing thereof is an enlarged view of part b in FIG. 2, and the lower drawing thereof is an enlarged view of part c in FIG. 2.

Figure 5A:
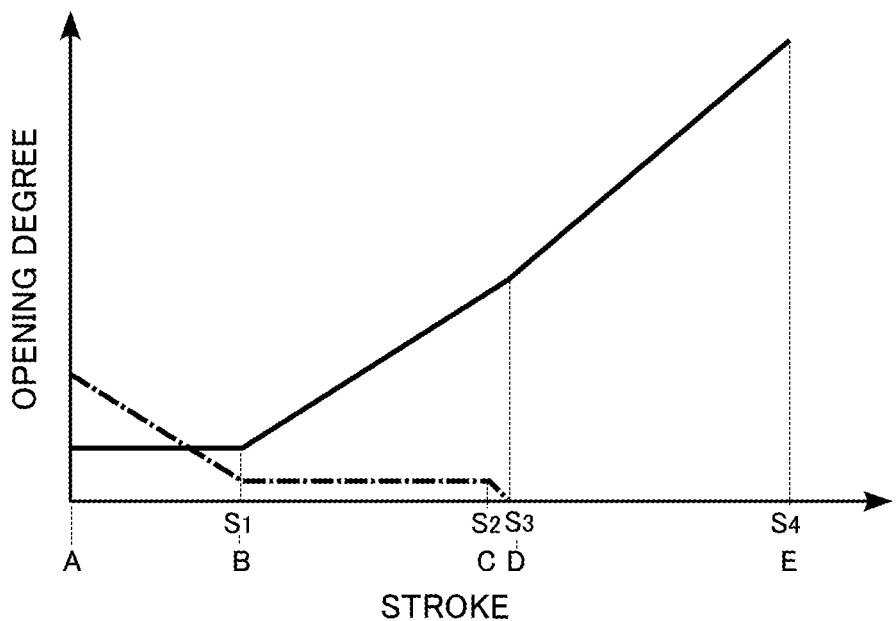
FIGS. 5A and 5B are graphs showing valve opening characteristics of a supply valve and a bleed valve.
Figure 5B:
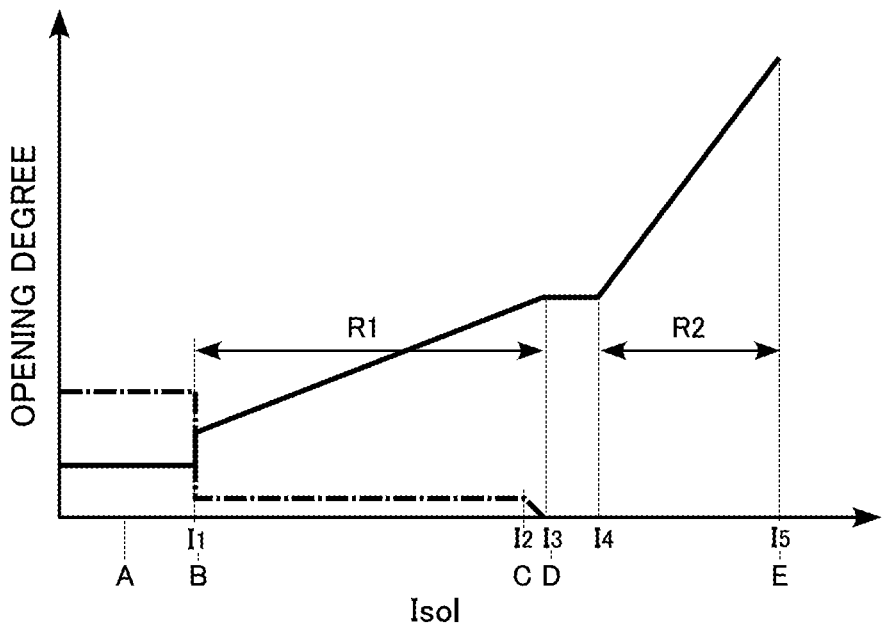

FIGS. 5A and 5B are graphs showing valve opening characteristics of the supply valve and the bleed valve. FIG. 5A shows the relation between the strokes of the valve elements and the valve opening degrees, and FIG. 5B shows the relation between the amount of current supplied to the solenoid and the valve opening degrees. In FIGS. 5A and 5B, an alternate long and short dashed line represents the supply valve (the first valve 7), and a solid line represents the bleed valve (combination of the second valve 8 and the third valve).

As illustrated in the lower drawing of FIG. 4A, an opening end of the first valve hole 20 has a two-step tapered shape including an upper taper 92 and a lower taper 94. The upper taper 92 constitutes the first valve seat 22. An orifice forming portion 96 parallel to the axis of the first valve hole 20 is formed between the upper taper 92 and the lower taper 94. When the first valve element 30 reaches the orifice forming portion 96, the first valve 7 functions as a fixed orifice. The first valve element 30 is inserted into and removed from the first valve hole 20 to touch and leave the first valve seat 22. Regarding the angle (taper angle) of the first valve hole 20 with respect to the axis, the taper angle at the lower taper 94 is smaller than that at the upper taper 92. This allows the first valve 7 to gradually open relative to the amount by which the first valve element 30 is lifted passing over the orifice forming portion 96.

In the meantime, as illustrated in the upper drawing of FIG. 4A, the spool portion 39 of the second valve element 36 has a cylindrical portion 100 parallel to the axis, and a tapered portion 102 having an outer diameter decreasing downward. The second valve element 36 performs opening/closing operation with respect to the second valve hole 32. The second valve 8, however, does not become fully closed since the orifice is formed between the spool portion 39 and the second valve hole 32 even while the second valve 8 is in the closed state.

With this structure, the operations of the valves illustrated in FIGS. 4A to 4E appear as the control characteristics shown in FIGS. 5A and 5B. Specifically, while the amount of current supplied to the solenoid 3 is in a range from zero to a lower limit current value $I_1$, the stroke is zero and the first valve 7 is maintained in the fully-open state (FIG. 4A). In this process, the bleed valve is such that the third valve 9 is maintained in the fully closed state and the second valve 8 functions as the fixed orifice.

When the amount of supplied current exceeds $I_1$, the first valve 7 starts to close, and the supply valve quickly turns into the fixed orifice (FIGS. 4B and 4C). In the meantime, as the stroke becomes larger with the increase in the amount of supplied current, the opening degree of the second valve 8 increases proportionally. In this process, the opening degree of the second valve 8 is controlled so that the suction pressure Ps is kept at the preset pressure $P_{set}$.

When the amount of supplied current exceeds $I_2$ and the stroke exceeds $S_2$, the first valve 7 operates toward the fully-closed state. Specifically, the first valve 7 is fully closed while the amount of supplied current is in a range from $I_3$ to the upper limit current value (FIG. 4D). In the meantime, when the amount of supplied current exceeds $I_3$, the flow rate of refrigerant flowing through the second valve 8 is saturated. When the amount of supplied current exceed $I_4$, the third valve 9 starts to open. As the stroke becomes larger with the increase in the amount of supplied current, the opening degree of the third valve 9 increases proportionally, and the bleed valve provides the bleeding function (FIG. 4E).

The control characteristics include a first control range R1 in which the opening degree of the second valve 8 increases with the increase in the amount of current supplied to the solenoid 3, and a second control range R2 in which the opening degree of the third valve 9 increases (that is, the opening degree of the bleed valve, which is combination of the second valve 8 and the third valve 9, further increases) with further increase in the amount of supplied current. As shown in FIG. 5B, the increase rate of the valve opening degree in the first control range R1 is smaller than that in the second control range R2.

As described above, in the present embodiment, since a state in which both of the first valve 7 and the second valve 8 let the refrigerant flow therethrough at the same time is included in the control characteristics, regulation of the valve opening degrees of the first valve 7 and the second valve 8 allows the internal circulation amount of the refrigerant in the compressor to be small and improves the power of the air conditioner. The first valve element 30 and the second valve element 36 each have a spool portion, which allows the valve open states of the first valve 7 and the second valve 8 to be switched smoothly when the current supplied to the solenoid 3 is changed as shown in FIG. 5B. Specifically, the second valve 8 is efficiently opened at closing timing of the first valve element 30 without stagnation (dead zone) of the valve opening operation of the second valve element 36.

In addition, since the second valve 8 and the third valve 9 are provided in two steps as the bleed valve, the valve opening efficiency of the bleed valve relative to the amount of current supplied to the solenoid 3 can be switched in a stepwise manner as shown in FIGS. 5A and 5B. Thus, during steady control of the compressor, the first control range R1 is used in which the bleed valve is controlled with high accuracy to maintain the suction pressure Ps at the preset pressure $P_{set}$. At the startup of the compressor, the second control range R2 is used in which the bleeding function is quickly provided. The increase rate of the valve opening degree is small in the first control range R1, which can facilitate suppressing of an increase in the control pressure Pc due to the blow-by gas, for example, and thus stabilize the capacity control.

When the operation is switched to the minimum capacity operation, the amount of current supplied to the solenoid 3 operation is set to the lower limit current value $I_1$ (an inflection point) or lower, which allows the first valve 7 (supply valve) to be quickly brought to the fully open state and allows this switching in the operation to be quickly carried out. Thus, when the discharging capacity is to be lowered at power-off of the compressor, an increase in the vehicle load, or the like, the control valve 1 for so-called outflow control provided with the supply valve (supply passage) achieves sufficient supply capacity and quickly switches the operation to the minimum capacity operation. The present embodiment allows the operation of the compressor to be maintained at high efficiency and allows efficient switching of the operation. The control valve 1 is particularly suitable for a clutchless compressor. Note that FIG. 5B shows the valve opening characteristics when the suction pressure Ps has a certain value. When the suction pressure Ps changes, the characteristics also change. Depending on the value of the suction pressure Ps, the first valve 7 (supply valve) may open before the amount of current supplied to the solenoid 3 decreases to $I_1$.

Furthermore, in the present embodiment, the bleed passage is open both during the maximum capacity operation and during the minimum capacity operation, which provides necessary and sufficient amounts of bleeding in both of the operation conditions. As a result, sufficient internal circulation of the refrigerant during the minimum capacity operation (while the amount of external circulation should be particularly small) is provided, and the bleeding function during the maximum capacity operation (while the amount of external circulation should be particularly large) is enhanced. This structure eliminates the need for a fixed orifice, which is typically provided in the compressor, or at least can make such a fixed orifice smaller. Consequently, the external circulation during the variable capacity operation is facilitated and the power of the air conditioner is improved. This leads to reduction in the load on the engine, which is a drive source of the compressor, and improves the fuel efficiency of the vehicle. Furthermore, the use of a single opening/closing mechanism both during the maximum capacity operation and during the minimum capacity operation provides an advantage that the above-described effects are achieved with a simple structure.

Second Embodiment

Figure 6:
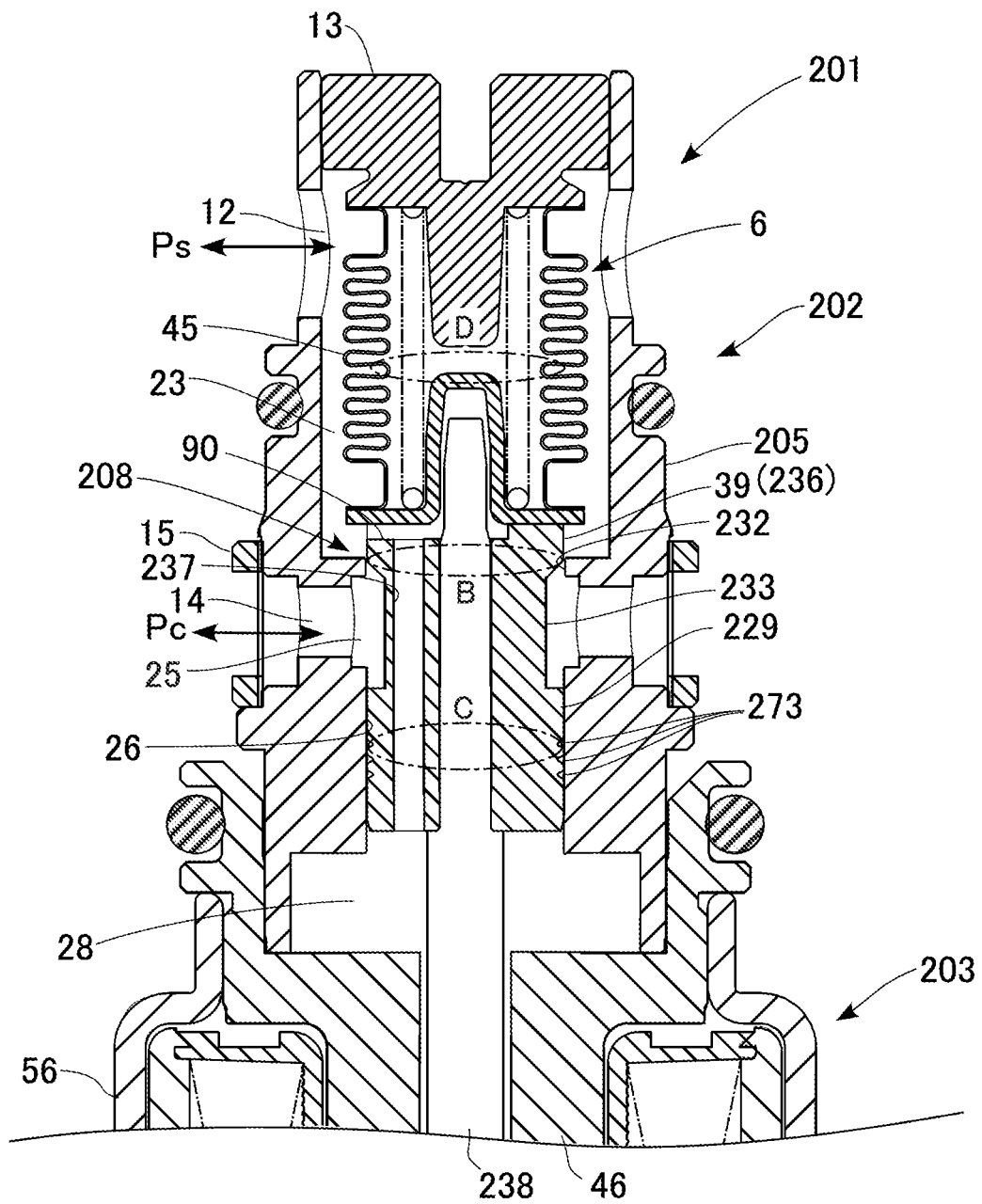
FIG. 6 is a partially enlarged cross-sectional view of an upper half of a control valve according to a second embodiment.

FIG. 6 is a partially enlarged cross-sectional view of an upper half of a control valve according to a second embodiment. The following description will be focused on differences from the first embodiment.

A control valve 201 is formed of an integral assembly of a valve unit 202 and a solenoid 203. The valve unit 202 includes a body 205, a power element 6, and so on. The control valve 201 has a structure in which the power element 6, a bleed valve 208, and the solenoid 203 are arranged in this order from one end thereof. The bleed valve 208 functions similarly to the second valve 8 of the first embodiment. In the present embodiment, no valves corresponding to the first valve 7 and the third valve 9 of the first embodiment are provided.

The body 205 has ports 12 and 14 formed in this order from an upper end thereof. No "discharge chamber communication port is formed. A valve drive member 229 is slidably inserted in a guiding passage 26. An upper part of the valve drive member 229 constitutes a reduced-diameter portion 233, which extends through a valve hole 232 and is integrated with a valve element 236. The valve element 236 has a spool portion 39, which is inserted into and removed from the valve hole 232 to close and open the bleed valve 208. The valve element 236 has no sliding portion. A communication passage (bleed passage), which constantly connects the working chamber 23 with the valve chamber 25, is formed between the valve element 236 and the valve hole 232.

A communication passage 237 is formed to extend through the valve drive member 229 in the axial direction. The working chamber 28 communicates with the working chamber 23 via the communication passage 237. A labyrinth seal 273 is provided around a sliding surface of the valve drive member 229 that slides relative to the guiding passage 26, to prevent flow of refrigerant through a spacing between the valve drive member 229 and the guiding passage 26.

Figure 7:
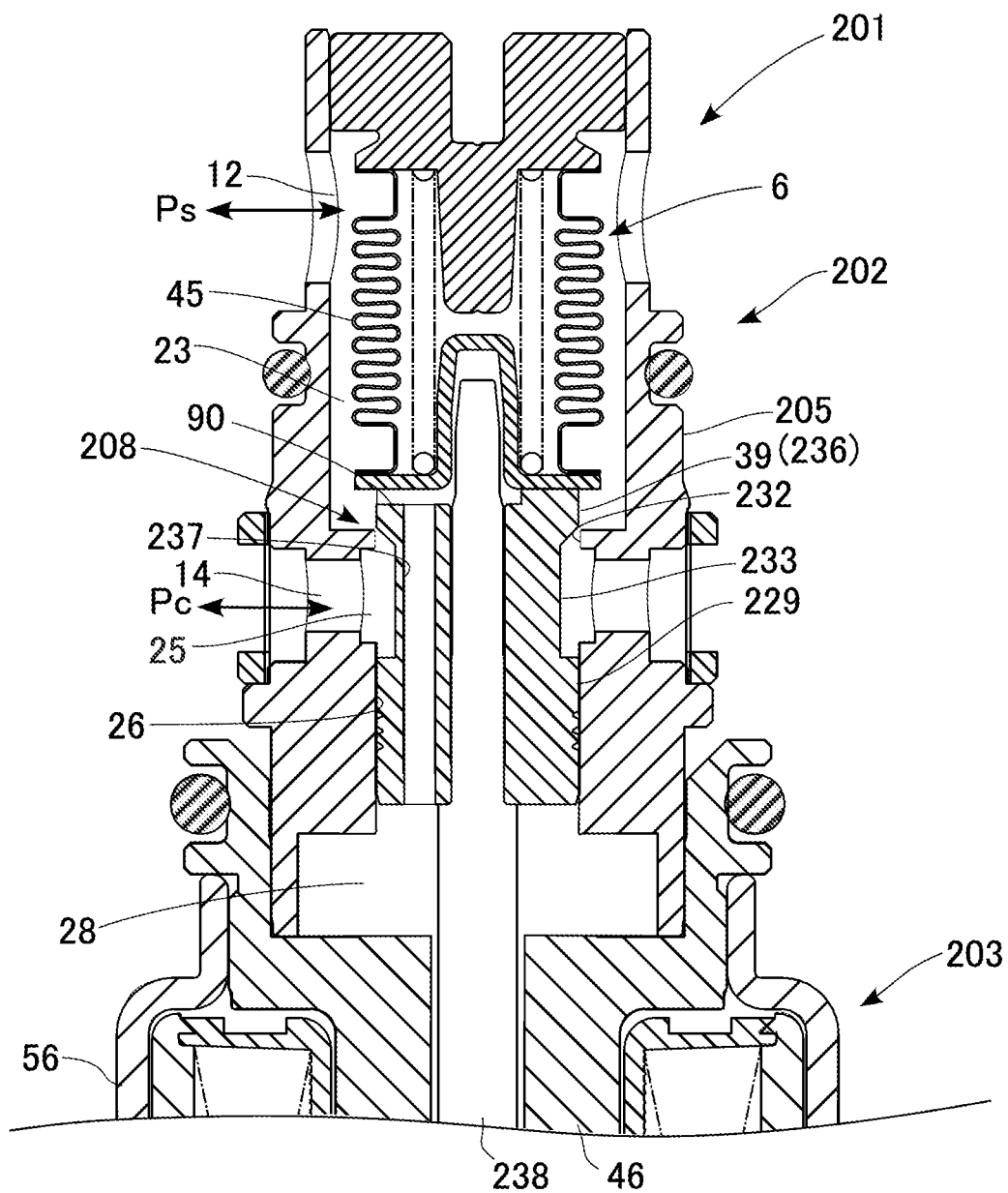
FIG. 7 illustrates operation of the control valve.

FIG. 7 illustrates operation of the control valve. FIG. 6, mentioned above, illustrates a state of the control valve during minimum capacity operation. FIG. 7 illustrates a state in which the bleeding function is carried out during maximum capacity operation (such as at the startup of the air conditioner).

In the control valve 201, while the solenoid 203 is powered off, the bleed valve 208 is in the closed state as illustrated in FIG. 6. In the meantime, no refrigerant is supplied through the control valve 201, but blow-by gas leaks into the control chamber in the compressor. The control pressure Pc then increases and the compressor performs the minimum capacity operation. In this process, since the bleed valve 208 is not fully closed but functions as an orifice, the refrigerant is released from the control chamber to the suction chamber at a predetermined flow rate. This prevents the control pressure Pc from becoming excessively high. In addition, the internal circulation of the refrigerant is maintained, and oil lubrication and cooling functions are also achieved in the compressor.

In contrast, when control current (starting current) is supplied to the solenoid 203, the actuating rod 238 lifts up the valve drive member 229, and thus the valve element 236 as illustrated in FIG. 7. As a result, the bleed valve 208 fully opens. This lowers the control pressure Pc, and the compressor performs the maximum capacity operation. In other words, the bleeding function is carried out and the compressor is quickly started.

When the current supplied to the solenoid 203 is within a control current range for the bleed valve 208, the opening degree of the bleed valve 208 is autonomously regulated so that the suction pressure Ps becomes a preset pressure $P_{set}$ set depending on the amount of supplied current.

Figure 8A:
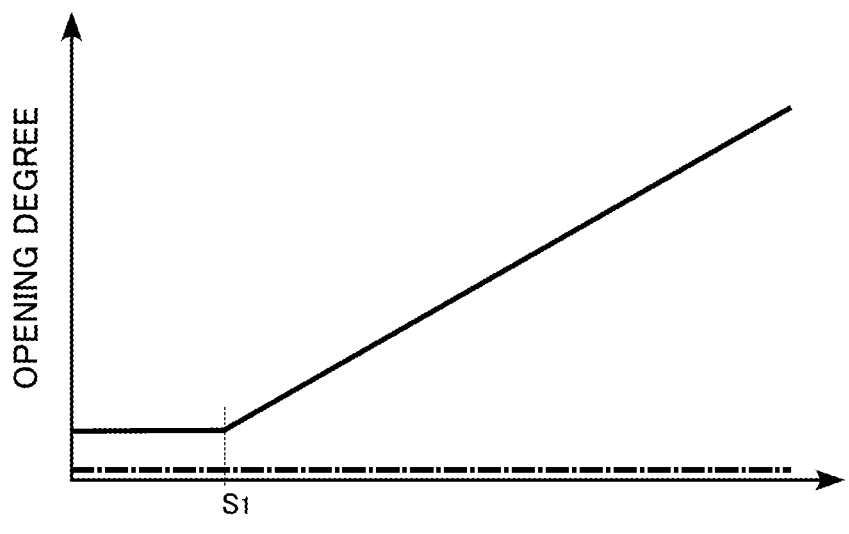
FIGS. 8A and 8B are graphs showing valve opening characteristics of a bleed valve.
Figure 8B:
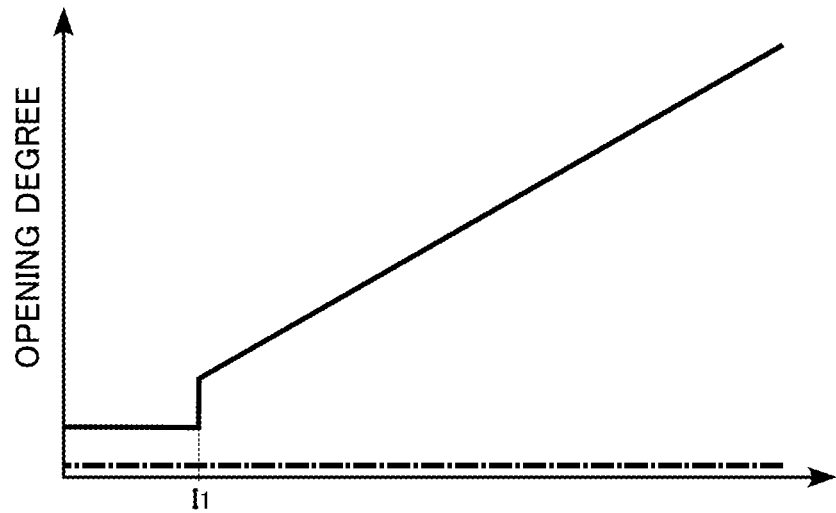

FIGS. 8A and 8B are graphs showing valve opening characteristics of the bleed valve. FIG. 8A shows the relation between the strokes of the valve elements and the valve opening degrees, and FIG. 8B shows the relation between the amount of current supplied to the solenoid and the valve opening degrees. In FIGS. 8A and 8B, a solid line represents the bleed valve 208, and an alternate long and short dashed line represents the supply passage in the compressor. While a blow-by gas passage constitutes the supply passage in the present embodiment, a fixed orifice may alternatively be provided in the compressor.

While the amount of current supplied to the solenoid 203 is in a range from zero to a lower limit current value $I_1$, the stroke is zero and the bleed valve 208 functions as a fixed orifice. Thus, appropriate bleeding is maintained by the control valve 201. In the meantime, refrigerant is supplied as blow-by gas in the compressor. Since the pressure difference (Pd−Pc) between the discharge pressure Pd and the control pressure Pc acting on respective sides of the piston of the compressor is large, the supply flow rate exceeds the bleed flow rate, and the compressor performs the minimum capacity operation.

When the amount of supplied current exceeds the opening degree of the bleed valve 208 increases proportionally as the stroke becomes larger with the increase in the amount of supplied current. In this process, the opening degree of the bleed valve 208 is controlled so that the suction pressure Ps is kept at the preset pressure $P_{set}$.

The control valve 201 of the present embodiment has a structure having the bleeding function as a main characteristic, which is simpler than the structure of the first embodiment an particularly suitable for a clutch compressor.

Third Embodiment

Figure 9:
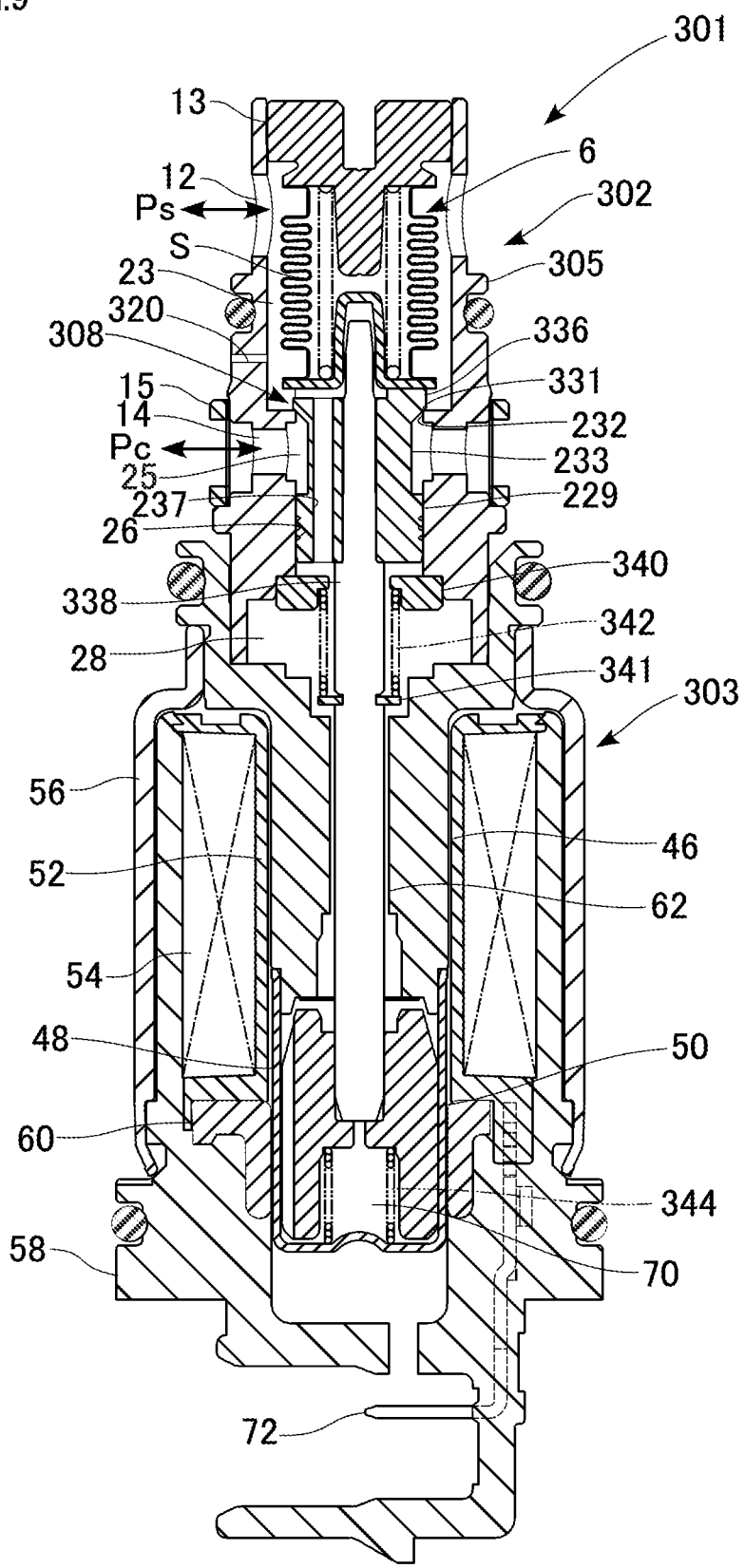
FIG. 9 is a cross-sectional view illustrating a control valve according to a third embodiment.

FIG. 9 is a cross-sectional view illustrating a control valve according to a third embodiment. The following description will be focused on differences from the second embodiment.

A control valve 301 is formed of an integral assembly of a valve unit 302 and a solenoid 303. The valve unit 302 includes a body 305, a power element 6, and so on. A valve seat 331 is formed at an open end of a valve hole 232 on the side of the working chamber 23. A valve element 336 does not have a spool portion 39 as in the second embodiment. The valve element 336 touches and leaves the valve seat 331 to close and open a bleed valve 308. The bleed valve 308 can be fully closed.

A spring support 340 is provided at a lower end of the body 305. The spring support 340 has a stepped disc-like shape, and is press-fitted into the body 305 in the working chamber 28. An actuating rod 338 extends through the spring support 340. In addition, a spring support 341 is fitted into a middle portion of the actuating rod 338. A spring 342 (functioning as a "biasing member") that biases the actuating rod 338 in the closing direction of the bleed valve 308 is mounted between the spring support 340 and the spring support 341. In addition, a spring 344 (functioning as a "biasing member") that biases the actuating rod 338 in the opening direction of the bleed valve 308 is mounted between a bottom of a sleeve 48 and a plunger 50.

In the present embodiment, when the solenoid 303 is powered off, the bleed valve 308 becomes fully closed. An orifice 320 is formed in a lateral wall of the body 305 so as to provide a predetermined amount of bleeding even while the solenoid 303 is powered off. The orifice 320 and the port 14 communicate with the control chamber. Thus, a bleed passage that constantly connects the orifice 320 with the port 12 via the working chamber 23 is formed. Bleeding at a predetermined flow rate is thus carried out whether the bleed valve 308 is open or closed.

Figure 10A:
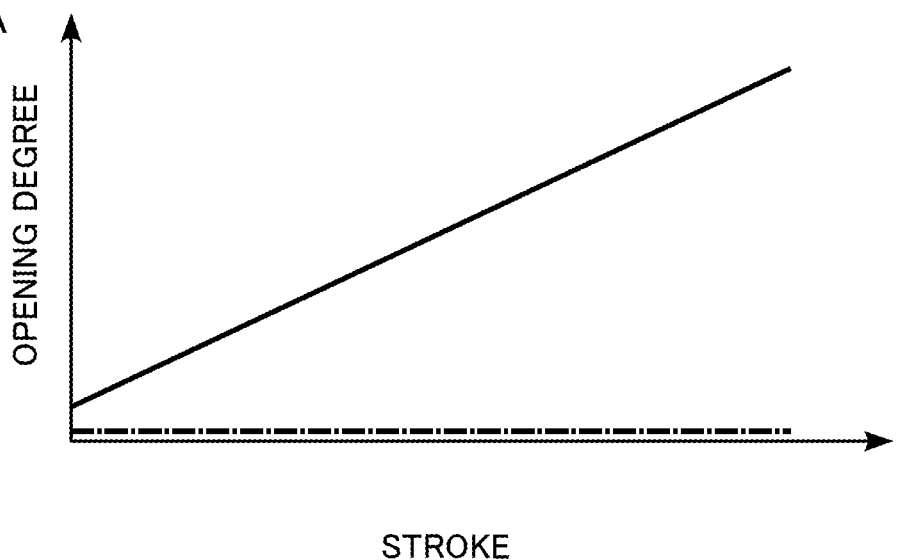
FIGS. 10A and 10B are graphs showing valve opening characteristics of a bleed valve.
Figure 10B:
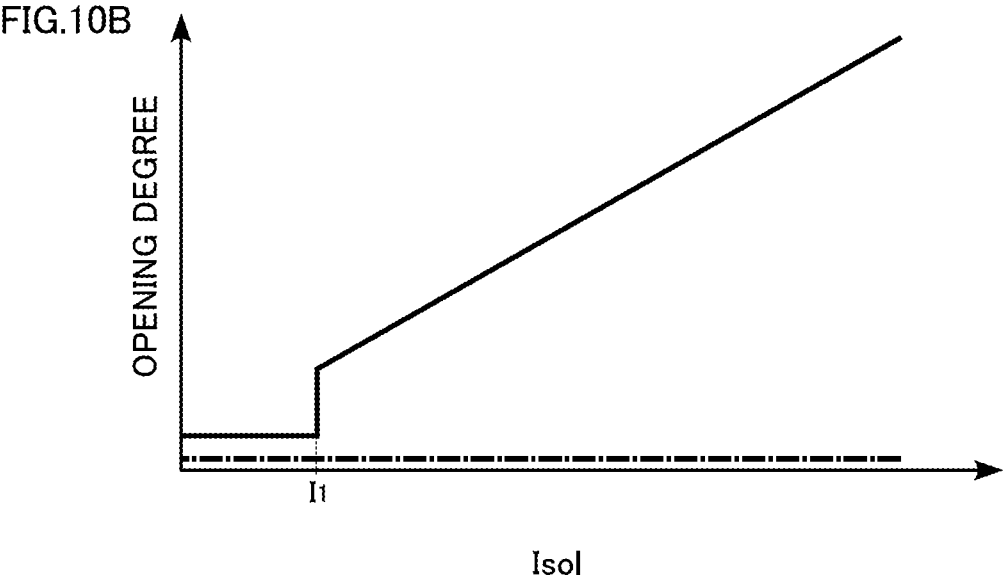

FIGS. 10A and 10B are graphs showing valve opening characteristics of the bleed valve. FIG. 10A shows the relation between the stroke of the valve element and the valve opening degree, and FIG. 10B shows the relation between the amount of current supplied to the solenoid and the valve opening degree. In FIGS. 10A and 10B, a solid line represents the bleed valve 308, and an alternate long and short dashed line represents a supply passage in the compressor.

While the amount of current supplied to the solenoid 303 is in a range from zero to a lower limit current value $I_1$, the stroke is zero and the bleed valve 308 is fully closed, but appropriate bleeding via the orifice 320 is maintained as described above. In the meantime, refrigerant is supplied as blow-by gas in the compressor. Since the supply flow rate is higher than the bleed flow rate, the compressor performs the minimum capacity operation.

When the amount of supplied current exceeds $I_1$, the opening degree of the bleed valve 308 increases proportionally as the stroke becomes larger with the increase in the amount of supplied current. In this process, the opening degree of the bleed valve 308 is controlled so that the suction pressure Ps is kept at the preset pressure $P_{set}$.

According to the present embodiment, effects similar to those of the second embodiment are produced even in the case where the valve element 336 does not have the spool structure.

Fourth Embodiment

Figure 11:
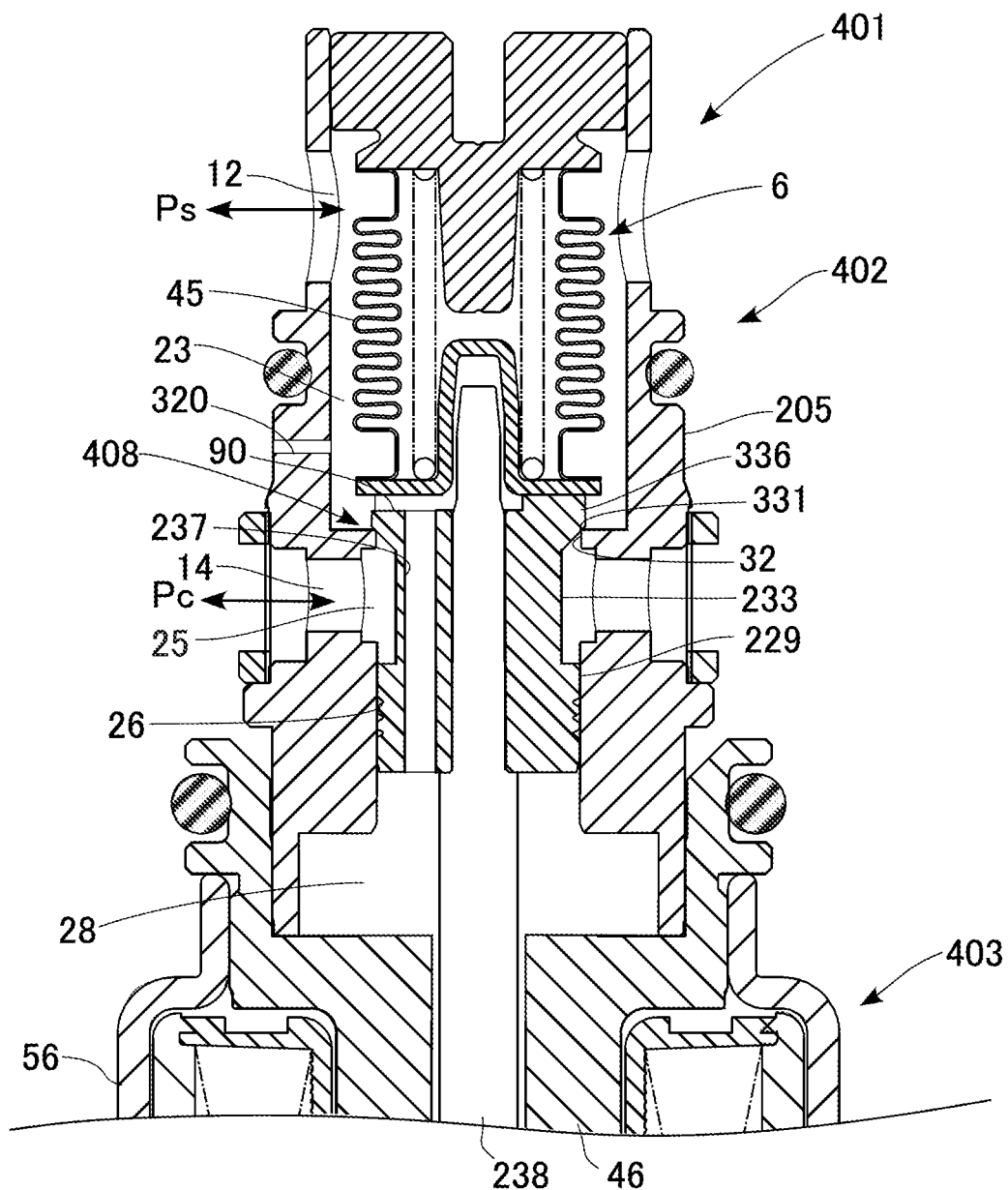
FIG. 11 is a partially enlarged cross-sectional view of an upper half of a control valve according to a fourth embodiment.
Figure 12A:
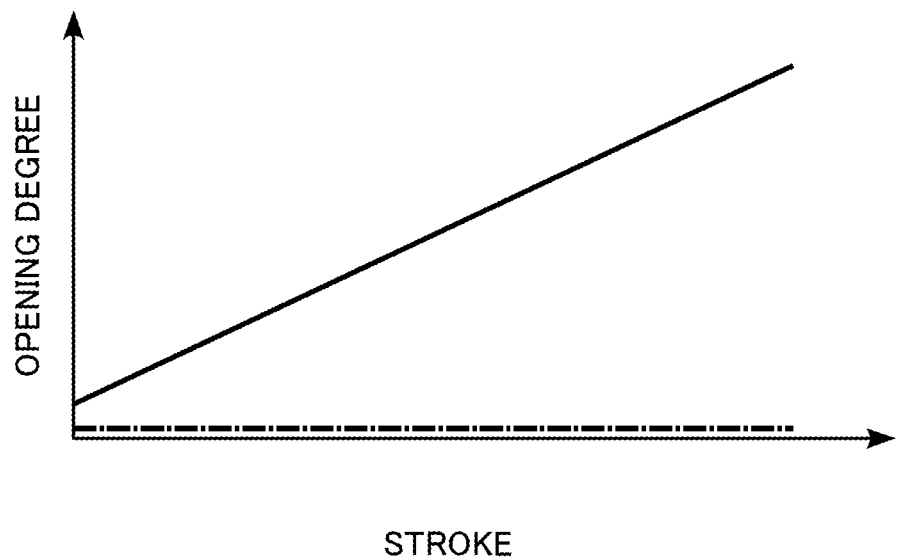
FIGS. 12A and 12B are graphs showing valve opening characteristics of a bleed valve.
Figure 12B:
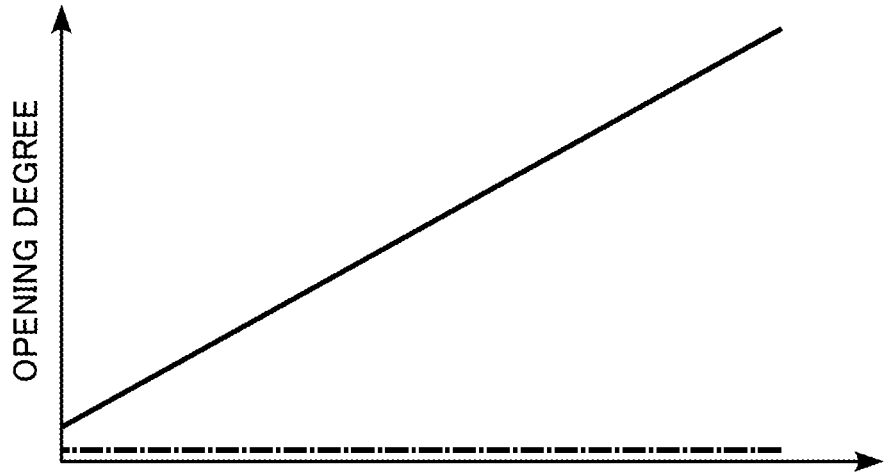

FIG. 11 is a partially enlarged cross-sectional view of an upper half of a control valve according to a fourth embodiment. The following description will be focused on differences from the third embodiment. FIGS. 12A and 12B are graphs showing valve opening characteristics of a bleed valve. FIG. 12A shows the relation between the stroke of a valve element and the valve opening degree, and FIG. 12B shows the relation between the amount of current supplied to the solenoid and the valve opening degree. In FIGS. 12A and 12B, a solid line represents a bleed valve 408, and an alternate long and short dashed line represents a supply passage in the compressor.

As illustrated in FIG. 11, a control valve 401 is formed of an integral assembly of a valve unit 402 and a solenoid 403. The valve unit 402 includes a body 205, a power element 6, and so on. The control valve 401 does not include the spring 342 of the third embodiment. Thus, as shown in FIGS. 12A and 12B, power supply to the solenoid 403 directly increases the opening degree of the bleed valve 408.

The description of the present invention given above is based upon certain embodiments. The embodiments are intended to be illustrative only and it will be obvious to those skilled in the art that various modifications could be further developed within the technical idea underlying the present invention.

In the first embodiment described above, an example in which the first valve 7 functions as a fixed orifice with a constant opening degree during steady control of the compressor (while the second valve 8 is controlled) has been presented. In a modification, the first valve 7 may function as a so-called clearance seal that blocks the flow of refrigerant instead of functioning as such an orifice. In another modification, the first valve 7 may have such a variable opening degree range in which the opening degree of the first valve 7 changes depending on the stroke of the first valve element 30 even while the second valve 8 is controlled. In other words, the variable opening degree ranges of the first valve 7 and the second valve 8 may overlap with each other.

In the embodiments described above, the so-called Ps sensing valve operating upon directly sensing the suction pressure Ps has been presented as the control valve. In a modification, the control valve may be a so-called Pc sensing valve operating upon sensing the control pressure Pc as a pressure to be sensed.

In the embodiments described above, the biasing member is a spring. Alternatively, other biasing members such as rubber may be used.

The present invention is not limited to the above-described embodiments and modifications only, and the components may be further modified to arrive at various other embodiments without departing from the scope of the invention. Various other embodiments may be further formed by combining, as appropriate, a plurality of structural components disclosed in the above-described embodiments and modifications. Furthermore, one or some of all of the components exemplified in the above-described embodiments and modifications may be left unused or removed.

What is claimed is:

1. A control valve applicable to a variable displacement compressor having a suction chamber, a discharge chamber, and a control chamber, and having a discharge capacity varied by regulating a pressure in the control chamber, the control valve comprising:
a body having a control chamber communication port communicating with the control chamber and a suction chamber communication port communicating with the suction chamber;
a valve element that moves toward and away from a valve hole to close and open a bleed valve, the control chamber communication port and the suction chamber communication port communicating with each other through the valve hole;
a solenoid to generate a drive force in an opening direction of the bleed valve depending on an amount of supplied current; and
a pressure sensing element to sense a pressure in the suction chamber or a pressure in the control chamber, and to generate a counterforce against the drive force from the solenoid depending on a magnitude of the sensed pressure,
wherein an opening degree of the bleed valve is controlled so that the sensed pressure becomes a set pressure associated with the amount of current supplied to the solenoid,
wherein a bleed passage for delivering refrigerant introduced through the control chamber communication port to the suction chamber even while the bleed valve is in a closed state is formed,
wherein the body further has a discharge chamber communication port communicating with the discharge chamber, and
wherein a supply valve for delivering refrigerant introduced through the discharge chamber communication port to the control chamber even while the bleed valve is controlled is provided,
wherein while the bleed valve is controlled, a range in which the supply valve has a constant opening degree is present,
wherein a state while the bleed valve is controlled is a state in which the valve element and the pressure sensing element are connected with each other to move integrally.

2. The control valve according to claim 1,
wherein in a range in which the opening degree of the supply valve changes, a range in which the bleed valve has a constant opening degree is present.

3. The control valve according to claim 2,
wherein the constant opening degrees of the bleed valve and the supply valve are provided by clearances between valve elements and valve holes of the bleed valve and the supply valve.

4. The control valve according to claim 1,
wherein the bleed passage is an orifice formed in the body.

5. The control valve according to claim 1, further comprising:
an opening/closing mechanism to open a communication passage allowing the control chamber and the suction chamber to communicate with each other depending on the amount of current supplied to the solenoid, the communication passage being formed in addition to the bleed passage.

6. The control valve according to claim 1,
wherein the valve element has a spool portion inserted into and removed from the valve hole, and
wherein an orifice that is the bleed passage is formed between the spool portion and the valve hole while the bleed valve is in the closed state.

7. A control valve applicable to a variable displacement compressor having a suction chamber, a discharge chamber, and a control chamber, and having a discharge capacity varied by regulating a pressure in the control chamber, the control valve comprising:
a body having a control chamber communication port communicating with the control chamber and a suction chamber communication port communicating with the suction chamber;
a valve element that moves toward and away from a valve hole to close and open a bleed valve, the control chamber communication port and the suction chamber communication port communicating with each other through the valve hole;

a solenoid to generate a drive force in an opening direction of the bleed valve depending on an amount of supplied current; and a pressure sensing element to sense a pressure in the suction chamber or a pressure in the control chamber, and to generate a counterforce against the drive force from the solenoid depending on a magnitude of the sensed pressure, wherein an opening degree of the bleed valve is controlled so that the sensed pressure becomes a set pressure associated with the amount of current supplied to the solenoid, wherein a bleed passage for delivering refrigerant introduced through the control chamber communication port to the suction chamber even while the bleed valve is in a closed state is formed, wherein the body further has a discharge chamber communication port communicating with the discharge chamber, and wherein a supply valve for delivering refrigerant introduced through the discharge chamber communication port to the control chamber even while the bleed valve is controlled is provided, wherein a valve chamber is provided between the control chamber communication port and the valve hole, wherein a valve element of the bleed valve includes:
    a sliding portion slidably supported in the valve hole;
    a spool portion inserted into and removed from the valve hole; and
    a reduced-diameter portion between the sliding portion and the spool portion, and wherein a cut-out reaching the reduced diameter portion and the valve chamber is formed in a lateral side of the valve element, the cut-out forming the bleed passage allowing the valve hole and the valve chamber to constantly communicate with each other.

* * * * *